United States Patent

[11] 3,557,350

[72] Inventor Thomas Proctor
 Lyndhurst, Ohio
[21] Appl. No. 686,879
[22] Filed Nov. 30, 1967
[45] Patented Jan. 19, 1971
[73] Assignee Allen-Bradley Company
 Milwaukee, Wis.
 a corporation of Wisconsin. by mesne assignments

[54] DIGITAL FEEDRATE GENERATOR
 11 Claims, 4 Drawing Figs.
[52] U.S. Cl. .................................................. 235/151.11,
  235/150.3, 235/152, 318/18
[51] Int. Cl. ........................................................ G06f 15/46,
  G06g 7/64
[50] Field of Search ............................................. 235/151.11,
  92, 152, 159, 197; 340/347; 318/18, 20.200,
  20.210, 20.320; 235/150.3

[56] References Cited
 UNITED STATES PATENTS
 3,230,353 1/1966 Greene et al. ............... 235/159
 3,290,492 12/1966 Hallmark ..................... 235/151.11
 3,303,332 2/1967 Goetz ......................... 235/151.11
 3,400,314 9/1968 Wilson ........................ 318/18

3,428,792 2/1969 Kelling ........................ 235/151.11
 *Primary Examiner*—Eugene G. Botz
 *Assistant Examiner*—Felix D. Gruber
 *Attorneys*—Arnold J. Ericsen and Richard C. Steinmetz, Jr.

ABSTRACT: In a numerically controlled machine tool there are provided a number of pulses in accordance with the extent of motion desired along each axis of the numerically controlled machine tool, at a rate which is determined by a feedrate generator under the control of digital data, designated by a feedrate number and recorded on a memory medium. The present invention provides for an additional feedrate generator which may be easily, accurately, and digitally controlled to provide pulses at a desired feedrate when it is desired to jog or manually control movement along an axis of a numerically controlled machine tool system, over a feedrate range controllable from zero to 100 percent of a nominal maximum value. The additional feedrate generator may also be used to produce pulses for driving the feedrate generator of the control system during automatic operation, thus enabling a modification of the block pulse rate fed to the system feedrate generator if desired. Provision is also made for preset maximum limits for each axis, when manual moves or jogs are executed, to avoid exceeding mechanical limits of travel of the individual slides and their drives.

3,557,350

1

DIGITAL FEEDRATE GENERATOR

BACKGROUND OF THE INVENTION

This invention relates to numerically controlled machine tools and more particularly to an improvement in feedrate generators which are employed with such numerically controlled machine tools.

A numerically controlled machine tool system employs a circuit arrangement, commonly known as a feedrate generator, for the purpose of determining the rate at which pulses are fed to the remainder of the system. This, in turn, determines the speed at which the machine tool table moves along the various slides corresponding to the various axes. On various occasions it becomes necessary to effect manual direction of a move or jog of the machine tool table. This may arise, for example, on the occasion of initial set up where it is desired to bring the machine tool to a starting point adjacent the work piece. Also, when it is desired to move the machine tool table for the purpose of inserting a new tool, it is desirable to use the manual or jog type of operation. While a punched tape or other storage system employed with the machine tool system provides feedrate control when the system is in its automatic operation mode, for job or manual operation there is no prerecorded feedrate control provision. Usually, for the jog operation a fixed feedrate is provided. Upon operating the jog control, the numerical controlled machine tool will immediately try to assume the velocity of the fixed feedrate which is recorded. Obviously, to avoid high starting and moving speeds, the fixed feedrate has to be made rather low.

Also, occasions arise where it is desired to alter the machine tool feedrate from the one fixed on the controlling storage medium. This can occur, for example, when a trial run is made or when a different material or different tool is provided than the one planned for when making up the control tapes.

OBJECTS AND SUMMARY OF THE INVENTION

An object of this invention is the provision of a feedrate generator for affording a manually controllable rate of machine tool operation for jog operations, and for automatic operations, if desired.

Another object of this invention is to provide a feedrate generator which in either the jog or automatic mode of operation and gradually increases feedrate to a maximum predetermined value, and then gradually decreases the feedrate as the end of the jog operation is approached.

Still another object of this invention is the provision of a novel and useful feedrate generator which provides for digital feedrate operation and may be manually controlled.

These and other objects of the present invention may be achieved in an arrangement wherein a controllable switching arrangement is provided to enable a desired modification of the feedrate of a numerically controlled machine tool either during jog or automatic operation. An arrangement is also provided which gradually increases the rate at which pulses are supplied during the start up period and which gradually decreases the rate at which pulses are supplied during the slow down period.

In one embodiment, the feedrate generator, in accordance with this invention, employs two binary rate multipliers. The output of the first binary rate multiplier supplies the second one. The second binary rate multiplier, in the automatic operation mode, supplies its output to the feedrate generator of the machine tool, and in the jog mode supplies its output directly to the servocircuit area of the machine tool. Controllable switches are used to determine the frequency of the pulses obtained at the output of the first feedrate generator. The second feedrate generator may be initially controlled by a counter which counts up to its maximum count, or to the value of a number, if the number is less than its maximum count. At that time the control of the second feedrate generator is determined by the number. This number, in the case of automatic operation, may be established from a motion modifier signal source and maybe derived from a code established on the tape controlling the machine tool. In the jog mode, this number is established separately for each axis. Toward the end of a run, the counter, which is an up-down counter, is permitted to count in reverse. This causes the output of the second binary rate multiplier to gradually decrease to zero.

A second embodiment of the invention is provided, wherein a third binary rate multiplier is employed which has applied to it the externally recorded or predetermined number, instead of using this number in conjunction with a counter, to control the second feedrate generator. The reversible counter is connected to digitally control a second feedrate generator which receives, as a clock input, the output of the first feedrate generator. Its output is applied to the clock terminal input of the third feedrate generator.

BRIEF DESCRIPTION OF THE DRAWINGS

Referring now to FIG. 1, there may be seen, in block diagram form, a generalized arrangement for this invention. This includes an arrangement for setting a desired feedrate or for modifying a predetermined feedrate. A grey code to binary code converter 10, comprising well-known circuitry for obtaining the indicated conversion, has its output determined by the setting of five 32 position switches, respectively 12A through 12E. The switches are connected to produce an output in grey code. The switches must each be of the shorting type to avoid discontinuity. The code converter 10 comprises a counter or other known arrangement which, in response to the setting of the switches, is operated to provide a digital output in binary code representative thereof. The binary output progresses from 00000 to 11111 as the switches are moved from their 0 to their 32nd position. The switches can be calibrated in percentages, if desired, since their setting may be used to modify, by a predetermined percentage, the input feedrate.

It should be understood that the foregoing is illustrative of a manually operable system to provide signals representative of any one of a range of numbers and should not be construed as a limitation upon the invention. Other arrangements may be used for producing a desired set of digital signals by setting switches which control a register to represent electrically the binary number established by the switch settings.

Figure 2:
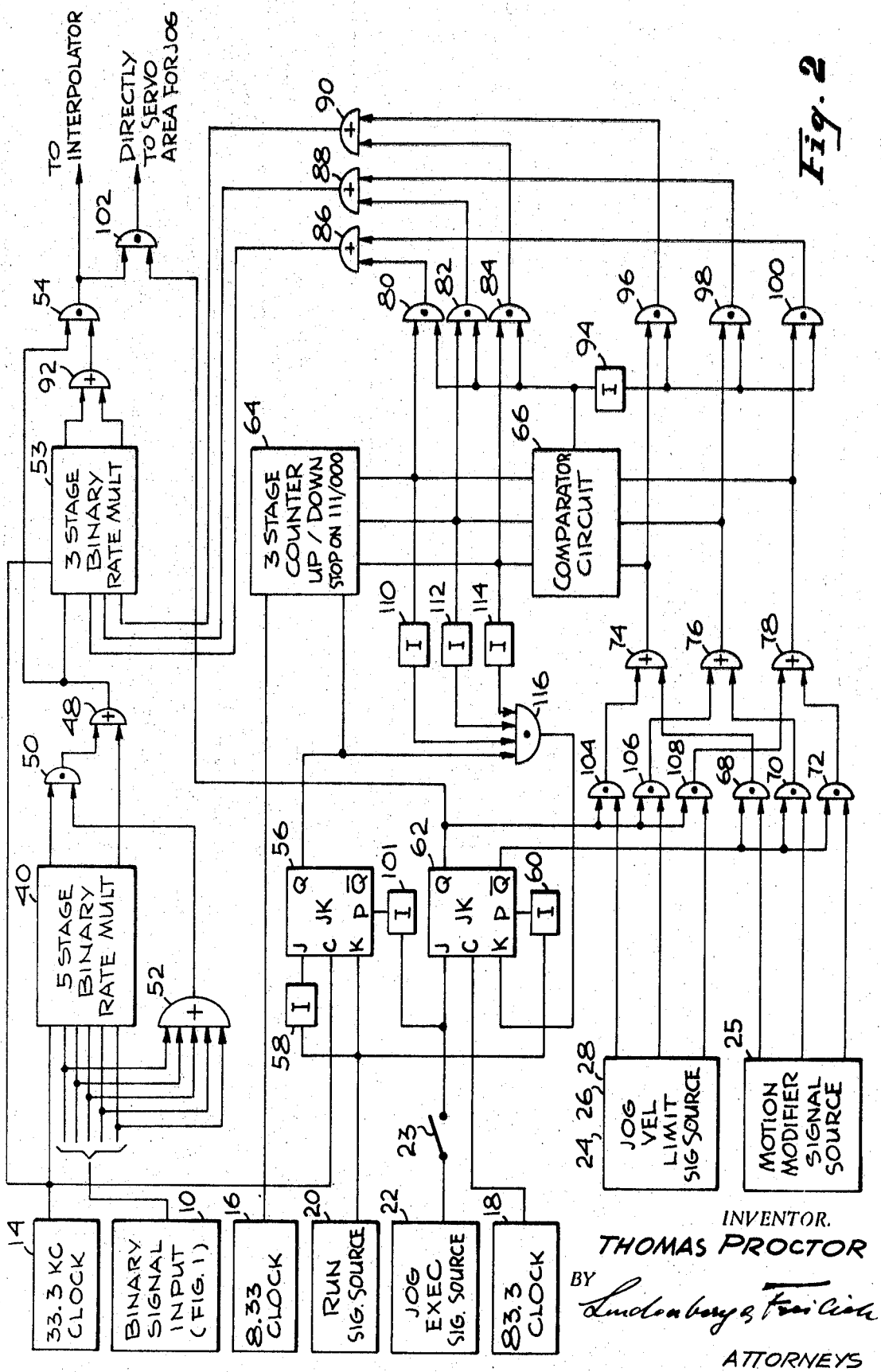
FIG. 2 is a block diagram illustrating details of the feedrate generator circuits of FIG. 1 along with other pertinent portions of FIG. 1.

The binary outputs of the code converter 10 are applied to the feedrate generator circuitry 12. The details of this circuitry are shown in FIG. 2 and also in FIG. 3. Other required inputs to the feedrate generator are the outputs of three clock frequency generators, respectively 14, 16, and 18. These may be derived in a well-known manner from a single master clock frequency source, if desired. By way of illustration, and not to serve as a limitation upon the invention, these clock frequencies are shown as 33.3 kc., 8.33 kc., and 83.3 kc. The 33.3 kc. clock is used to establish the maximum feedrate generator output which can cause a slide to move, by way of example, at 200 inches per minute with a 0.0001 inch resolution. The 8.33 cycles per second clock establishes the rate of increase or decrease of a step function which provides automatic acceleration and deceleration to occur at the beginning and end of the manual motion. The 83.3 kc. clock is used to clock a switch contact into the logic circuits. The functions of these will become more clear as this explanation progresses.

When it is desired to operate the feedrate generator automatically, a run signal is obtained from a run signal source 20, which is part of the usual numerical control circuitry. Effectively it is enabling signal which is obtained while the system is operated automatically. During the automatic machine tool operation, a clock input is applied to the feedrate generator 21 of the numerical control system. A jog execute signal is obtained from a signal source 22 and is employed when it is desired to manually control the motion of each one of the slides of the machine tool. The jog execute signal is applied by means of a manually operated switch 23, which is held closed for as long as motion along a slide is desired.

During the automatic operation of the feedrate generator, a binary signal input designated as a "motion modifier signal" derived from a source 25 is provided. This motion modifier signal effectively is a feedrate number which is used by the feedrate generator 12 to modify the pulse rate established in response to the output of the grey code to binary code converter 10. Signals of this type may be recorded on the punched tape being used to control the system. The motion modifier signal is usually a "111" signal which, in the illustrated arrangement, means that it is not serving any motion modification purpose. This too will become more clear as this explanation proceeds.

Figure 1:
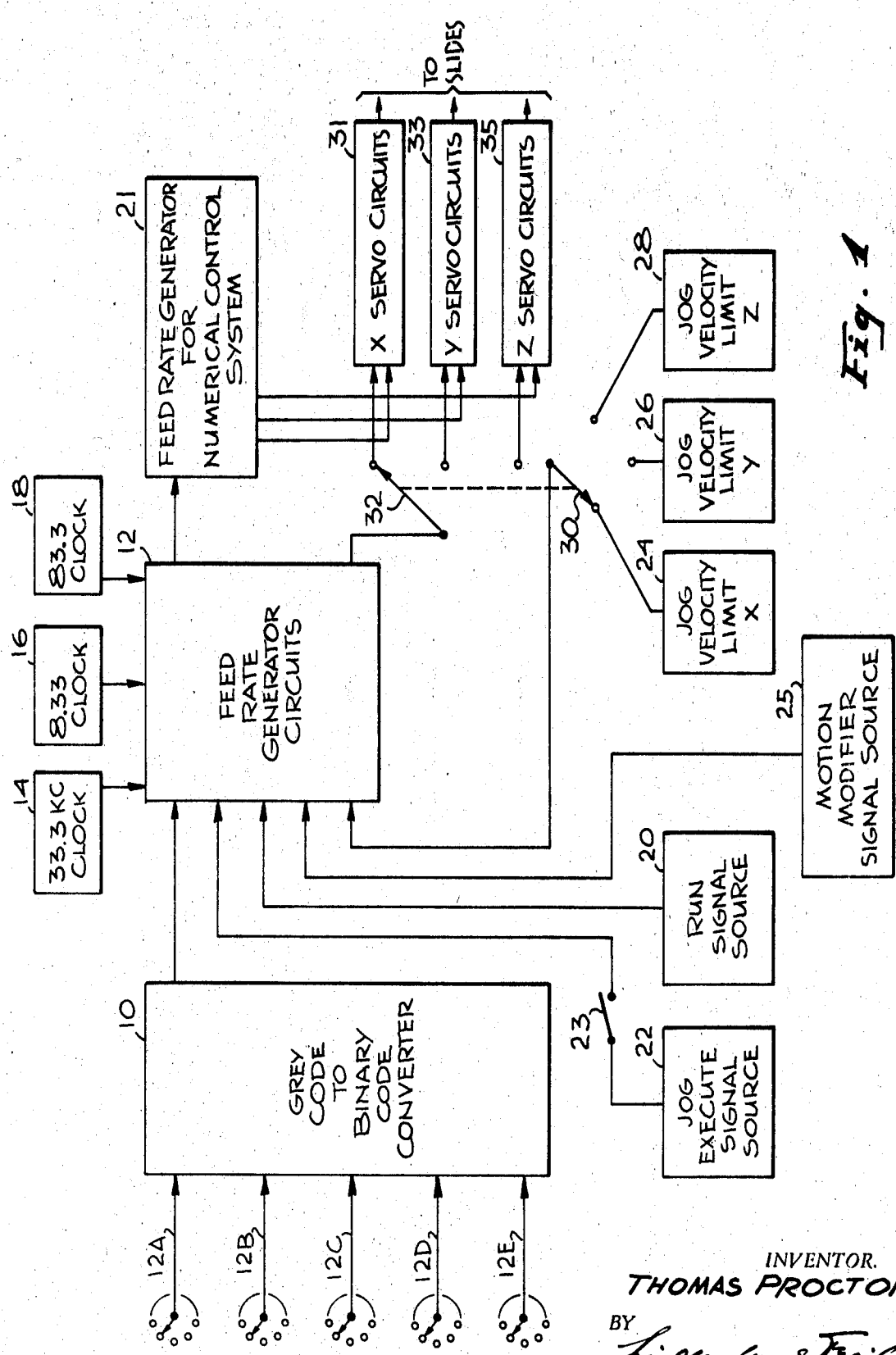
FIG. 1 is a block diagram illustrative of the invention.

Since, during a manual jog operation, each slide is moved separately, and since, due to construction peculiarities, it is desirable in the jog mode to operate each slide at a different velocity, a different velocity number is effectively wired into the system for each axis. These numbers are converted into electrical signals either by setting flip-flops to be representative thereof, or by connecting or not several conductors to a power source, or by any other means for generating the requisite signals, of which the foregoing is merely exemplary. In FIG. 1, these three jog motion modifiers are represented by the three rectangles, respectively 24, 26, and 28, which are designated as jog velocity limits X, Y, and Z.

The X, Y, and Z jog velocity limits are respectively connected to the feedrate generator circuits by means of a manually operable three-position selector switch 30, which is also ganged with a three-position selector switch 32, to connect the output of the feedrate generator circuits to the servocontrol circuits, respectively 31, 33, 35, of the particular axis whose jog velocity limit is connected into the feedrate generator by the switch 30. As will become evident from the description of FIG. 2 later on herein, the output lines from the X, Y and Z jog velocity limits 24, 26, and 28 in FIG. 1 actually comprise three lines, as is also the case for each of the input lines to the X, Y and Z servocircuits 31, 33, and 35. Accordingly, the switch representations 30 and 32 should each be considered as representing a three-pole three-position switch.

Reference is now made to FIG. 2, which is a detailed block diagram of an embodiment of the invention. Assume that it is desired to operate the numerical control system in the automatic mode. The switches 12A through 12E are set to a position representative of the percentage modification, if any, that is desired of the feedrate provided by the usual feedrate generator of the numerical control system. If no percentage modification or reduction of the feedrate is desired, then the switches are set to their optimum or 11111 positions. The digital signal output of the grey code to binary code converter is applied to a five-stage binary rate multiplier 40, and also to an OR gate 52.

Figure 3:
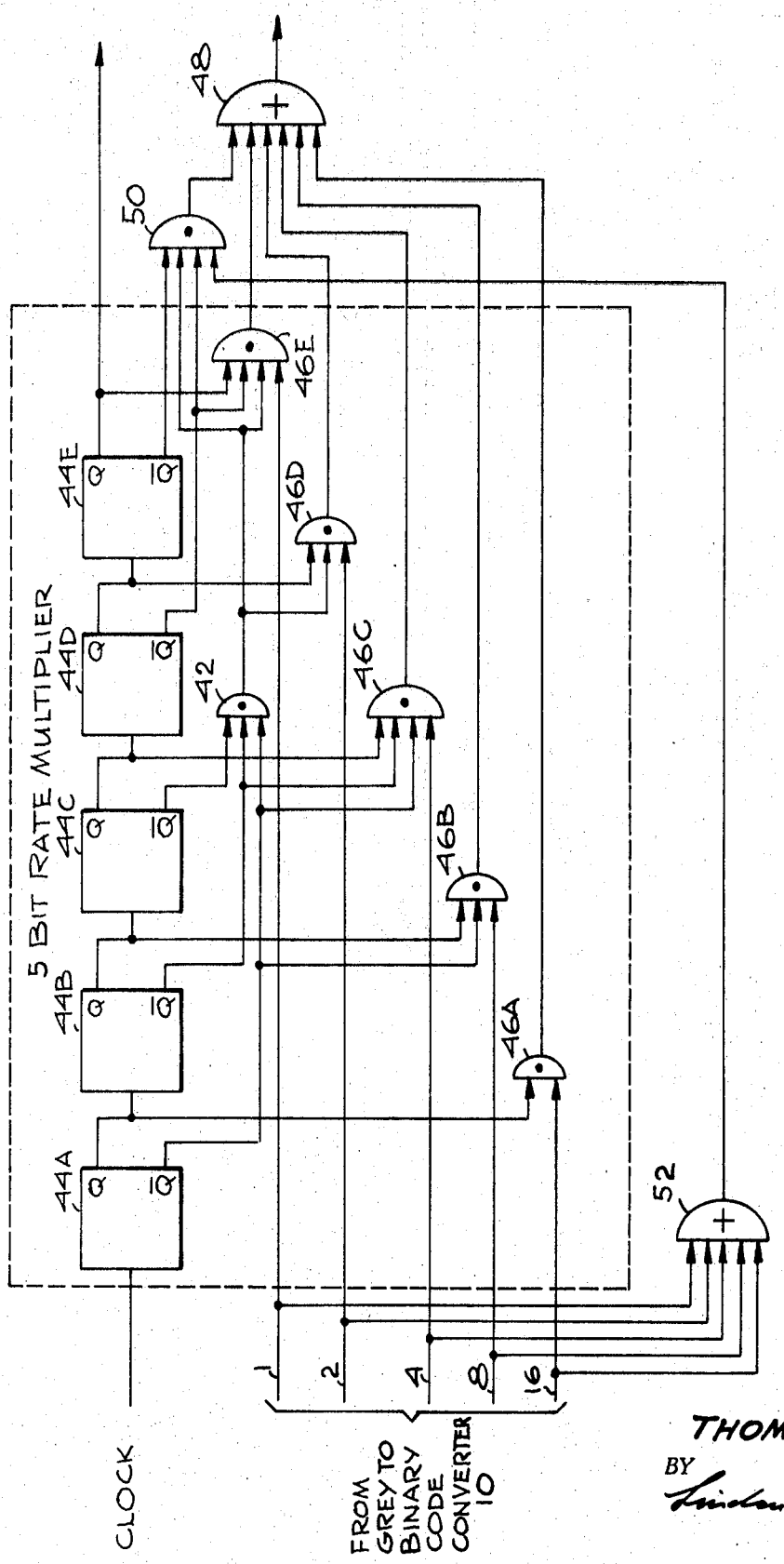
FIG. 3 is a detailed block schematic diagram of one embodiment of a binary rate multiplier circuit in accordance with this invention.

A binary rate multiplier circuit is well-known, but for the purpose of clarity in the connections thereto, a simplified block diagram is shown in FIG. 3. A plurality of flip-flops (here five), respectively designated as 44A, 44B, 44C, 44D, and 44E, are arranged and interconnected as a cyclical binary counter. The 33.3kH clock output is applied to the first flip-flop 44A, which, in response thereto, provides Q and $\bar{Q}$ outputs alternately at a frequency of $33.3kH^2/2$. The flip-flop 44A Q output drives flip-flop 44B, which provides Q and $\bar{Q}$ outputs in response thereto at a frequency of $33.3kH^2/4$. Similarly, the Q and $\bar{Q}$ outputs of flip-flop 44C occur alternately at a $33.3kH^2/8$ rate, flip-flop 44D Q and $\bar{Q}$ outputs occur alternately at a $33.3kH^2/16$ rate, and flip-flop 44E Q and $\bar{Q}$ outputs occur at a $33.3kH^2/32$ rate.

An AND gate 46A is enabled by the 16 output line of the grey to binary converter 10. The second required input to this AND gate is derived from the Q output of flip-flop 44A. Thus, for a complete cycle of operation of the flip-flop counter, AND gate 46A will deliver 16 output pulses.

An AND gate 46B has three inputs. One is the 8 output line of the grey to binary code converter 10. A second is derived from the $\bar{Q}$ output of flip-flop 44A, and a third is the Q output of flip-flop 44B. Thus, for a complete cycle of operation of the flip-flop counter, AND gate 46B provides eight output pulses.

An AND gate 46C is enabled by the 4 output of the grey to binary code converter 10. It also receives the $\bar{Q}$ output of flip-flop 44A, the $\bar{Q}$ output of flip-flop 44B, and the Q output of flip-flop 44C. Therefore, in a cycle of counter operation, AND gate 46C produces only four output pulses.

AND gate 42 collects the $\bar{Q}$ outputs of flip-flops 44A, 44B, and 44C to produce four output pulses at its output for every cycle of the counter. These are applied as one input to an AND gate 46D. A second input to this AND gate is the 2 output of the code converter 10. A third input in the Q output of flip-flop 44D. The output of AND gate 46D comprises two pulses for every cycle of operation of the counter.

An AND gate 46E produces one output pulse per cycle of the counter. This occurs in the presence of a 1 output from the code converter 10, an output from AND gate 42, a $\bar{Q}$ output from flip-flop 44D, and a Q output from flip-flop 44E.

An AND gate 50 collects all the $\bar{Q}$ outputs of the entire counter as well as the output of an OR gate 52. OR gate 52 produces an enabling pulse when any one of the code converter outputs is high. Thus, in operation, AND gate 50 produces an output only when the counter is driven to its zero count state. This output is an end carry pulse. An OR gate 48 collects the outputs from all of the AND gates 4 46A through 46E and 50. Its output comprises a pulse train for each cycle of the counter which will contain a number of pulses determined by all of the outputs of the grey to binary converter 10, which are enabled, plus an end carry pulse.

Now, referring back to FIG. 2, the output of OR gate 48 comprises successive pulse trains which are applied to a three-stage binary rate multiplier 53 and also to an AND gate 54. These pulse trains are repeated at a frequency determined by the clock pulse frequency and size of the counter. The number of pulses in each pulse train is determined by the digital number input to the binary rate multiplier 53. The three-stage binary rate multiplier 53 is identical with the five-stage binary rate multiplier 40 which has just been described except that it is smaller and each one of the AND gates which collects output from the flip-flop stages of the three-stage binary counter has another input, namely, a clock input from the 33.3 kc. clock pulse source, for the purpose of assisting in shaping the output pulses.

Assume now that it is desired to operate the numerical machine tool control in the automatic mode. The code converter 10 either may be set to the 11111 condition if no modification of the feedrate of the system is desired, or it may be set to modify the feedrate in accordance with the desired percentage.

A run signal from a source 20 is applied to the K input of a JK flip-flop 56 and also through an inverter 58 to the J input of the flip-flop. It is also applied through an inverter 60 to the P input of the JK flip-flop 62. The effect of the run signal 20 on the JK flip-flop 62 is to place it and hold it in its reset state if it is not already there. The 33.3 kc. clock output is applied to the clock terminal C of JK flip-flop 56, and on the first negative transition of a clock pulse, in the presence of a run pulse applied to the K-terminal, flip-flop 56 is driven to its reset state, with its $\bar{Q}$ output high.

JK flip-flops of the type described are well-known and are commercially available. These flip-flops are purchasable, by way of example, from Texas Instruments Company, of Dallas, Tex., or Fairchild Camera and Instrument Corp. of Plainview, N.Y.

When the JK flip-flop 56 is reset, its Q output is low. This Q output is applied to an "up-down" or reversible three-stage counter 64. In the presence of a high Q single, the counter counts down; in the presence of a low Q signal, it counts up. Since flip-flop 56 is now reset, Q is low and the counter commences to count up at a rate determined by the pulses received from the 8.33 kHz. clock 16. The outputs from the three-stage counter 64 are applied to a comparator circuit 66, which serves to compare the count output of the counter with the number represented by the output received from the motion modifier signal source 25. This may also be a three binary bit number, as is also the output of the three-stage counter 64. The motion modifier output is applied to the comparator 66 by way of three AND gates, one for each binary bit, respectively designated as 68, 70, and 72. An enabling input to these three AND gates is received from the $\bar{Q}$ output of the JK flip-flop 62, which is high, as a result of the run signal being applied thereto. The outputs from the three AND gates 68, 70, and 72 are respectively applied to the three OR gates 74, 76, and 78.

The output from the comparator 66 is high when the value of the binary code output from the counter 64 is equal to or less than the binary value of the outputs from the AND gates 68, 70, and 72. Since the counter starts from a 000 position, the output of the comparator circuit is high at the outset. This high output is applied to enable three AND gates, respectively 80, 82 and 84, which are thus enabled to pass the binary count outputs of the counter 64 to three OR gates, respectively 86, 88, and 90. The outputs from these three OR gates are each applied to the gates included (but not shown here) in the three-stage binary rate multiplier to determine the number of pulses in a pulse train which are generated in a count cycle, in the same manner as the output from the grey to binary code converter controls the number of pulses received in a pulse train from the five-stage binary rate multiplier 40 in a count cycle. The train of pulses from the three-stage binary rate multiplier 53 plus the end carry pulse are all applied to an OR gate 92 whose output is applied as an enabling output to the AND gate 54. Accordingly, for each pulse received from the three-stage binary rate multiplier 53, AND gate 54 transmits a pulse to the feedrate generator of the numerically controlled machine tool.

To summarize the operation described thus far, upon the application of a run signal to the feedrate generator, a counter is enabled to commence counting, and this count value is compared with the value represented by the digital signals from a motion modifier. Until the counter reaches the numerical value of the signals provided by the motion modifier, a comparator circuit applies the output of the counter to a three-stage binary rate multiplier, with the result that the output of the three-stage binary rate multiplier comprises successive pulse trains, each successive pulse train having an increasing number of pulses.

When the number being generated by the counter 64 exceeds the number represented by the motion modifier, then the comparator circuit output becomes low. This results in blocking AND gates 80, 82, and 84. An inverter 94 inverts this low output and applies it as an enabling input to three AND gates, respectively 96, 98, and 100. These three AND gates can then pass the number represented by the output of the motion modifier signal source, in place of the number represented by the output of the counter through the OR gates 86, 88, and 90 through the three-stage binary rate multiplier 53. As a result, the output of the three-stage binary rate multiplier is now controlled by the number represented by the motion modifier.

If the motion modifier number is 111 and the counter output number is 111, it is immaterial whether the digital signals applied to the binary rate multiplier 53 are those of the counter or the motion modifier, and that is why no switching occurs when the comparator shows these as equal.

When the run signal is terminated, then the low run signal is inverted by the inverter 58 and applied to the J input terminal of flip-flop 56, where, upon the occurrence of the next negative going clock pulse from the 33.3 kc. clock pulse source, the flip-flop 56 is set, thereby applying a high Q signal to the counter control terminal. As a result, the counter 64 commences to count down toward the 000 state, whereby, when the binary number represented by its output equals or goes below the motion modifier number, the three-stage binary rate multiplier is once again under the control of the counter and a gradually diminishing number of pulses is provided by the rate multiplier 53 to the feedrate generator 21.

Assume now that it is desired to jog the machine tool. The switches 30 and 32 are set to whichever of the axes it is desired to jog first. The switch 23 is then closed, permitting a signal from the jog execute signal source 22 to be applied to the J input of flip-flop 62 and, through an inverter 101, to the P input of flip-flop 56, enabling it to be driven to its reset state upon the negative transition of the next 33.3 clock pulse source applied to its C input. This will cause the Q output of the flip-flop 56 to go low, whereupon the three-stage counter 64 can commence counting up from its 000 state, in response to the 8.33 kc. clock pulse source.

When the flip-flop 62 reaches its set state, its Q output going high enables an AND gate 102 so that it can now pass the pulses received from the AND gate 54, and also three AND gates 104, 106, and 108 are enabled. AND gates 68, 70, and 72 are disabled when the $\bar{Q}$ output of the flip-flop 62 goes low. The enabled AND gates 104, 106, and 108 apply the binary number represented by the output of the jog velocity limit signal source to the OR gates 74, 76, and 78, which in turn apply them to the comparator circuit 66. As before, until the counter 64 exceeds the value of the binary number provided by the jog velocity limit source, the output of the comparator 66 is high. As a result, the OR gates 86, 88, and 90 enable the counter 64 to control the pulses provided by the binary rate multiplier 53. When the counter number exceeds the number provided by the jog velocity limit source, then the jog velocity limit source number is substituted for controlling the three-stage binary rate multiplier by means of the AND gates 96, 98, and 100 and OR gates 86, 88, and 90. Accordingly, at this time the machine tool slides are controlled in response to the jog signal.

When the jog signal switch 23 is opened, the signal applied to the inverter 101 is low, whereupon it will apply a high signal to the P terminal of flip-flop 56. Upon the next negative going transition of the 33.3 kc. clock signal applied to the C input of this flip-flop, the flip-flop is driven to its set state, causing a high signal to be applied to the reversible or up-down counter 64. This causes the counter to commence to count-down. When it reaches 000, three inverters, respectively 110, 112, and 114, invert these signals and apply them to an AND gate 116. The fourth required AND gate input is the Q output of the flip-flop 56. The output of the AND gate 116 is applied to the K input of flip-flop 62 with the result that, at the next negative going transition of the pulse applied to its C input from the 83.3 kc. clock pulse source, flip-flop 62 is reset.

Accordingly, by way of resume, when the jog execute signal is applied to the feedrate generator, the output of the binary rate multiplier 53 gradually increases under control of the counter 64 until the jog velocity limit number takes over control. Pulses are applied to the servocircuits of the particular slide being controlled at that time. When the jog execute signal is terminated, the three-stage counter is then permitted to count-down, to take over control of the binary rate multiplier 53, whereby the number of pulses applied to the servocontrol circuits of the particular slide is gradually reduced to zero, thus enabling the slide to gradually slow down. The system then resets itself. The feedrate generator which has been described enables a precise digital control in the output rate of the pulses used for moving the machine tool. Furthermore, the startup is automatically gradual until a maximum rate is attained, and the termination also is automatically gradual, thus enabling precise coasting of the machine tool slides to the desired position.

Figure 4:
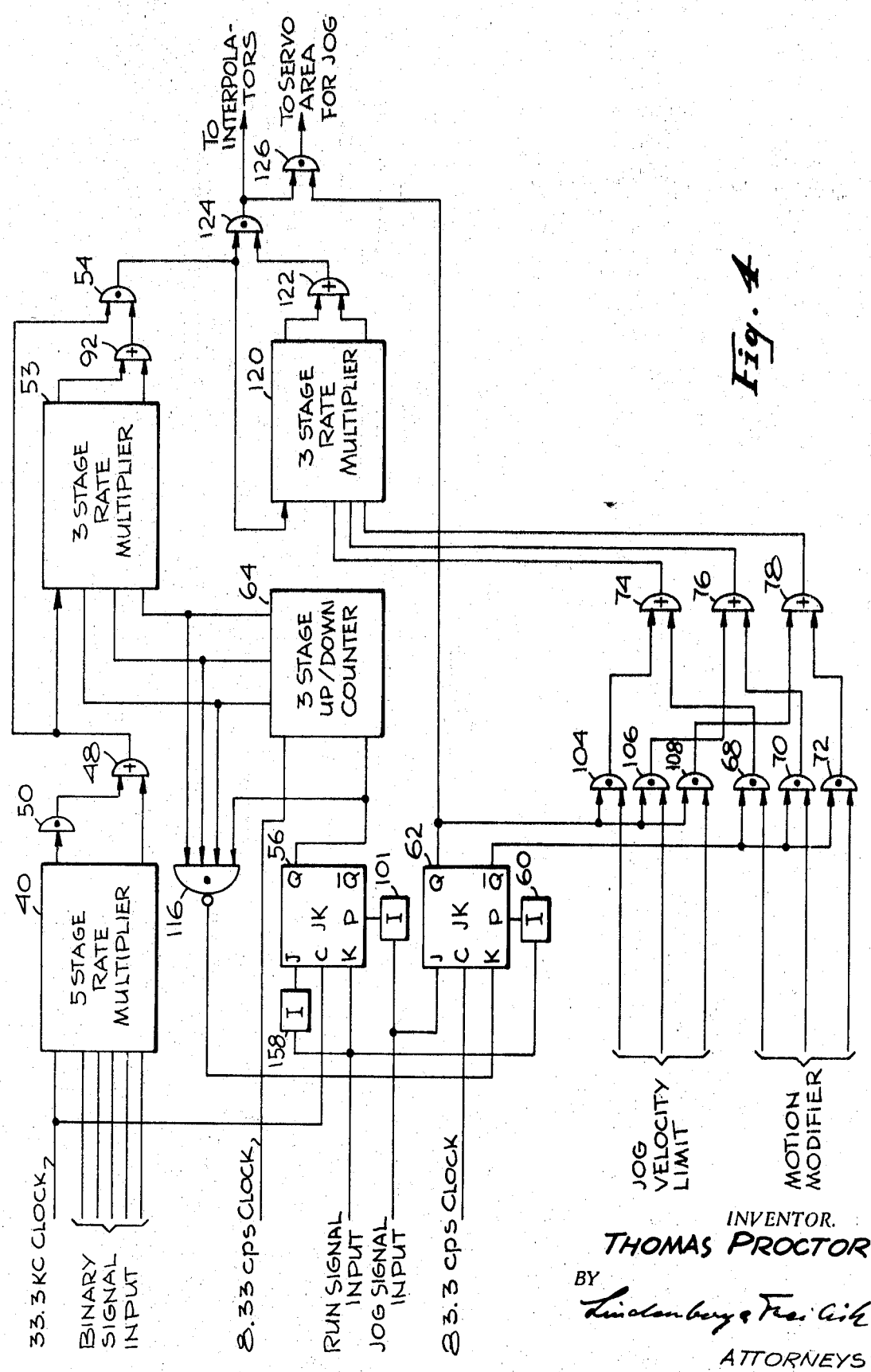
FIG. 4 is a block schematic diagram of another embodiment of a feedrate generator in accordance with this invention.

FIG. 4 is a block schematic diagram of another embodiment of the invention. Similarly functioning apparatus is given the same reference numeral as the apparatus to which it corresponds in FIG. 2. In this embodiment of the invention, the comparator is eliminated. Instead, the up-down counter 64, in the presence of either a run signal input or a jog signal input, starts counting up in response to the flip-flop 56 being reset, as before. The counter thus controls the rate at which pulses are delivered by the rate multiplier 53 from a minimum to a maximum determined by the three-stage counter reaching its 111 state. The output of the AND gate 54, when the counter 64 reaches its maximum count condition, effectively consists of the pulses provided by the output of the preceding rate multiplier 40. These pulses are applied to another three-stage rate multiplier 120. This three-stage rate multiplier is controlled by the motion modifier number directly, in the presence of a run input signal, or by the jog velocity limit number, in the presence of a jog execute signal. This may be seen by the fact that the Q output of the flip-flop 62, which is high in the presence of a jog execute signal, enables the AND gates 104, 106, and 108, whereby the jog velocity limit number may be applied to the AND gates 104, 106, and 108 and through corresponding OR gates 74, 76, and 78 to the digital inputs of the three-stage rate multiplier 120. Also, when the flip-flop 62 is placed in its reset state, in response to a run signal being received, its Q output is high, whereby the AND gates 68, 70, and 72 are enabled to apply the motion modifier binary number through OR gates 74, 76, and 78 to the digital inputs of the three-stage rate multiplier 120.

The output of the AND gate 54 serves as a clock to drive the counter of the three-stage rate multiplier 120, and the digital inputs received from the OR gates 74, 76, and 78 determine the number of pulses in each recurring pulse train which constitutes the output of the rate multiplier. An OR gate 122 receives the output of all the gates (not shown) of the rate multiplier in addition to the end carry pulse from its counter (not shown). The output of the OR gate 122 is applied to an AND gate 124, which also has applied thereto the output of the AND gate 54. As a result, the output of the AND gate 124 is a pulse for every pulse received through the OR gate 122, which output is clocked or shaped by the pulses received from the AND gate 54. The output of AND gate 124 is applied to the feedrate generator of the contour generator and also to an AND gate 126. AND gate 126 is enabled to pass the pulses it receives when the Q output of flip-flop 62 is high, which occurs in the presence of a jog execute input. The output of AND gate 126 is applied to one of the servocontrol circuits of the slides in the same manner as was indicated in FIG. 1.

The advantage of the circuit arrangement shown in FIG. 4 over the previous one is that, with a velocity limit imposed by the jog velocity number or motion modifier number, the number of acceleration steps and deceleration steps will always be the same, since they are controlled by the steps required for the counter to count up to its full count.

There has accordingly been described and shown herein a novel, useful, and unique arrangement for a feedrate generator which enables precise control of the feedrate pulse train either in the automatic or in the jog mode, with an acceleration and deceleration at the commencement and the termination of the indicated operation. Control is, simply, digital and manual from 0 to 100 percent of a nominal maximum value.

I claim:

1. A feedrate generator circuit arrangement comprising:
   means for generating a first set of digital signals;
   means for generating a second set of digital signals;
   first rate multiplier means;
   means for applying said first set of digital signals to said first rate multiplier means, said first rate multiplier means being operative to recurrently produce a train of pulses in response to said first set of digital signals, the number of pulses in each train being determined by said first set of digital signals;
   clock pulse means for driving said first rate multiplier means to cause recurrence of each pulse train of said recurrent pulse trains at a predetermined rate;
   second rate multiplier means;
   means for intermittently applying said second set of digital signals to said second rate multiplier means, said second rate multiplier means being operative to recurrently produce a train of pulses in response to said second set of digital signals, the number of pulses in each train being determined by said second set of digital signals; and
   means for applying the recurrent pulse train output of said first rate multiplier means to said second rate multiplier means, said second rate multiplier means being operative in response to the recurrent pulse train output of said first rate multiplier means to provide pulse trains having a rate of recurrence responsive to the output of said first rate multiplier means and having a number of pulses in each pulse train determined by said second set of digital signals.

2. A feedrate generator as recited in claim 1, wherein said means for applying said second set of digital signals to said second rate multiplier means includes:
   a counter;
   means for causing said counter to count up from its lowest count condition for successively producing digital signals having successively increasing numerical values; and
   means responsive to said second set of digital signals and to the output of said counter for applying said successively produced digital signals to said second rate multiplier means until said counter digital output signals exceed in value said second digital signals and thereafter applying said second set of digital signals to said second rate multiplier means.

3. Apparatus as recited in claim 2, wherein said means for applying the digital output signals of said counter to said rate multiplier means until the value exceeds the value of said second digital signals comprises:
   a comparator having an output and first and second inputs;
   means for applying said counter digital output signals to the first input of said comparator;
   means for supplying said second digital signals to the second input of said comparator;
   a first set of AND gates to which said digital output signals of said counter are applied;
   a second set of AND gates to which said second digital signals are applied;
   a plurality of OR gates;
   means for connecting the inputs of said OR gates to said first and second AND gates;
   means for connecting the outputs of said OR gates to the inputs of said second rate multiplier means;
   means for enabling said first set of AND gates responsive to said comparator output when said counter digital output signals are equal or less than said second digital signals; and
   means for enabling said second set of AND gates when said counter digital output signals exceed in value the value of said second digital signals.

4. Apparatus as recited in claim 3 wherein said means for producing second digital signals includes:
   means for generating jog digital signals and means for generating motion modifier digital signals;
   a third and a fourth set of AND gates;
   means for applying said jog digital signals to said third set of AND gates;
   means for applying said motion modifier digital signals to said fourth set of AND gates;
   OR gate means for coupling the outputs of said third and fourth sets of AND gates to the input of said comparator means and to the inputs of said second set of AND gates;
   means for enabling said third set of AND gates to pass said job digital signals when a jog operation is desired;

means for enabling said fourth set of AND gates to pass said motion modifier digital signals when an automatic operation is desired; and gate means, for providing a first output from said second rate multiplier in response to said third set of AND gates being enabled, and a second output from said second rate multiplier means when said fourth set of AND gates is enabled.

5. Apparatus as recited in claim 1 wherein said means for producing first digital signals includes a plurality of switch means settable to establish a plurality of signals having a desired numerical value.

6. Apparatus as recited in claim 1 wherein said means for applying the recurrent pulse train output of said first rate multiplier to said second rate multiplier to drive said second rate multiplier includes:

a third rate multiplier having an input connected to the output of said first rate multiplier to be driven thereby and having its output connected to said second rate multiplier to drive said second rate multiplier;

a counter;

means for applying pulses to said counter to cause it to count from its lowest count condition to its highest count condition to produce binary output signals; and means for applying said binary output signals to the input of said third rate multiplier for enabling said third rate multiplier to produce recurrent output pulse trains each having a number responsive to the value of the digital signals applied to said third rate multiplier input by said counter.

7. Apparatus as recited in claim 6 wherein said means for producing second digital signals includes:

jog digital signal producing means and motion modifier digital signal-producing means;

a first plurality of AND gates;

a second plurality of AND gates;

means for applying jog digital signals to said first plurality of AND gates;

means for applying said motion modifier digital signals to said second plurality of AND gates;

a plurality of OR gates;

means for connecting the outputs of said first and second pluralities of AND gates to respective inputs of said plurality of OR gates;

means for connecting the outputs of said plurality of OR gates to the input of said second rate multiplier;

means for enabling said first plurality of AND gates when it is desired to execute a jog operation;

means for enabling said second plurality of AND gates when it is desired to execute an automatic operation; and gate means for producing a second recurrent train of pulses from the output of said second rate multiplier only when said first plurality of AND gates is enabled.

8. A feedrate generator for a numerical control system comprising:

a first rate multiplier means for producing recurrent pulse trains;

a second rate multiplier means for producing recurrent pulse trains;

clock pulse input means for determining a frequency of operation of each of said rate multiplier means;

digital signal input means for determining the number of pulses in each of said recurrent pulse trains;

manually controllable means for generating first digital signals;

means for applying said first digital signals to the digital signal input means of said first rate multiplier means;

means for generating jog digital signals;

means for generating motion modifier digital signals;

first gate means for applying, when enabled, said jog digital signals to said digital signal input means of said second rate multiplier means;

second gate means for applying, when enabled, said motion modifier digital signals to said digital signal input means of said second rate multiplier means;

control means for enabling said first gate means when a jog operation is desired;

for enabling said second gate means when an automatic operation is desired; and means for applying the output of said first rate multiplier means to the clock pulse input means of said second rate multiplier means.

9. Apparatus as recited in claim 8 wherein said control means comprises:

reversible counter means having a clock pulse input for causing said counter to alter its count states responsive to clock pulses and a control input terminal means for enabling said counter to count in an increasing direction, producing digital output signals of an increasing value responsive to a first signal, and enabling said counter to count in a decreasing direction, producing output digital signals of a decreasing value, responsive to a second signal;

flip-flop means having a first state for applying a first signal to said reversible countercontrol input terminal means and a second state for applying a second signal to said countercontrol input terminal means;

a third gate means;

a fourth gate means;

means for connecting the outputs of said first and second gate means to said fourth gate means;

means for connecting the output of said countermeans to said third gate means;

means connecting the outputs of said third and fourth gate means to said digital signal input means of said second rate multiplier means;

means for driving said flip-flop means to its first state to produce a first output upon the actuation of either said first or said second gate means;

comparator means for enabling said third gate means to permit the output of said countermeans to be applied to said second rate multiplier means for a predetermined interval, and thereafter enabling said fourth gate means to apply its digital output in place of the digital output of said third gate means to said digital signal input means of said second rate multiplier mean;

means operative upon the termination of an enabling signal to either said first or said second gate means for driving said flip-flop means to its second state to cause said reversible counter means to commence counting in a downward direction; and means responsive to said counter means counting in said downward direction for disabling said fourth gate means and enabling said third gate means for applying the output of said third gate means to said digital signal input means of said second binary rate multiplier means.

10. Apparatus as recited in claim 8 wherein said means for applying the output of said first rate multiplier means to the clock pulse input means of said second rate multiplier means includes:

a third rate multiplier means having a clock pulse input means and a plurality of digital inputs responsive to which the number of pulses in a recurrent pulse train output of said third rate multiplier means is determined;

means for connecting the output of said first rate multiplier means to the clock pulse input means of said third rate multiplier means;

means for connecting the output of said third rate multiplier means to the clock pulse input means of said second rate multiplier means;

a reversible counter having a clock pulse input terminal means for driving said counter responsive to clock pulses being applied thereto and a control terminal means for causing said counter to count in an increasing direction producing a sequence of binary signals having an increasing value in response to a first signal, and for causing said counter to count in a decreasing direction producing digital output signals having a decreasing value in response to a second signal;

flip-flop means having a first state for applying a first signal to said reversible countercontrol terminal means and a second state for applying a second signal to said reversible countercontrol terminal means;

means for applying the output of said reversible counter to the digital inputs of said third rate multiplier means;

means responsive to the application of an enabling signal to said first gate means or to said second gate means for transferring said flip-flop means to its first state; and means responsive to the removal of said enabling signal from said first gate means or from said second gate means for transferring said flip-flop means to its second state.

11. In combination with a numerically controlled machine tool system, wherein there is provided a feedrate generator for generating recurrent pulse trains having the number of pulses in a pulse train determined by a feedrate word, said recurrent pulse trains being applied to an interpolator circuit for each axis for determining the total number of pulses to be applied to servocontrol circuits for each axis for controlling the amount of movement to occur along each axis over a predetermined interval:

an additional feedrate generator means having a first output connected to the feedrate generator of said machine tool system for providing clock pulses thereto and a second output selectively connected to the respective servocontrol circuits for each of the axes of said machine tool system, said additional feedrate generator including a manually controllable means for generating a plurality of digital signals having desired values;

means for producing for each axis a plurality of jog digital signals representative of desired numerical values for each axis of said machine tool system;

counter means for generating digital signals of successively increasing numerical values;

feedrate means responsive to said digital signals from said manually controllable means for generating digital signals, and responsive to the digital signals from one of said jog digital signal-producing means and to the digital signals from said counter means for producing at its output recurrent pulse trains having the number of pulses in each pulse train initially determined by the digital output of said counter means reaching a maximum number determined by the value of said one of the jog digitals signals and at a frequency determined by the value of the digital signals generated by said manually controllable means for generating digital signals; and means for applying the output of said additional feedrate generator means to the one of said servocontrol circuits which drives the slide axis corresponding to the one of the jog digital signals associated with that axis which is applied to said additional feedrate generator means.

UNITED STATES PATENT OFFICE
CERTIFICATE OF CORRECTION

Patent No. 3,557,350          Dated January 19, 1971

Inventor(s) Thomas Proctor

It is certified that error appears in the above-identified patent and that said Letters Patent are hereby corrected as shown below:

Column 2, Line 75     before "enabling" insert -- an --

Column 3, Line 69     "33.3kH$^2$/2 should be -- 33.3KH/2 --

Column 3, Line 71     "33.3kH$^2$/4 should be -- 33.3KH/4 --

Column 3, Line 73     "33.3kH$^2$/8 should be -- 33.3KH/8 --

Column 3, Line 74     "33.3kH$^2$/16 should be -- 33.3KH/16 --

Column 3, Line 75     "33.3kH$^2$/32 should be -- 33.3KH/32 --

Column 4, Line 6      8 should be -- "8" --

Column 4, Line 12     4 should be -- "4" --

Column 4, Line 20     2 should be -- "2" --

Column 4, Line 22     "in the Q output" should be -- is the Q output --

Column 4, Line 25     1 should be -- "1" --

Column 4, Line 35     "4 46A" should be -- 46A --

Column 5, Line 7      "8.33 kH$_z$" should be -- 8.33 CPS --

Signed and sealed this 6th day of July 1971.

(SEAL)
Attest:

EDWARD M. FLETCHER, JR.          WILLIAM E. SCHUYLER, JR.
Attesting Officer                Commissioner of Patents